Figure 1:
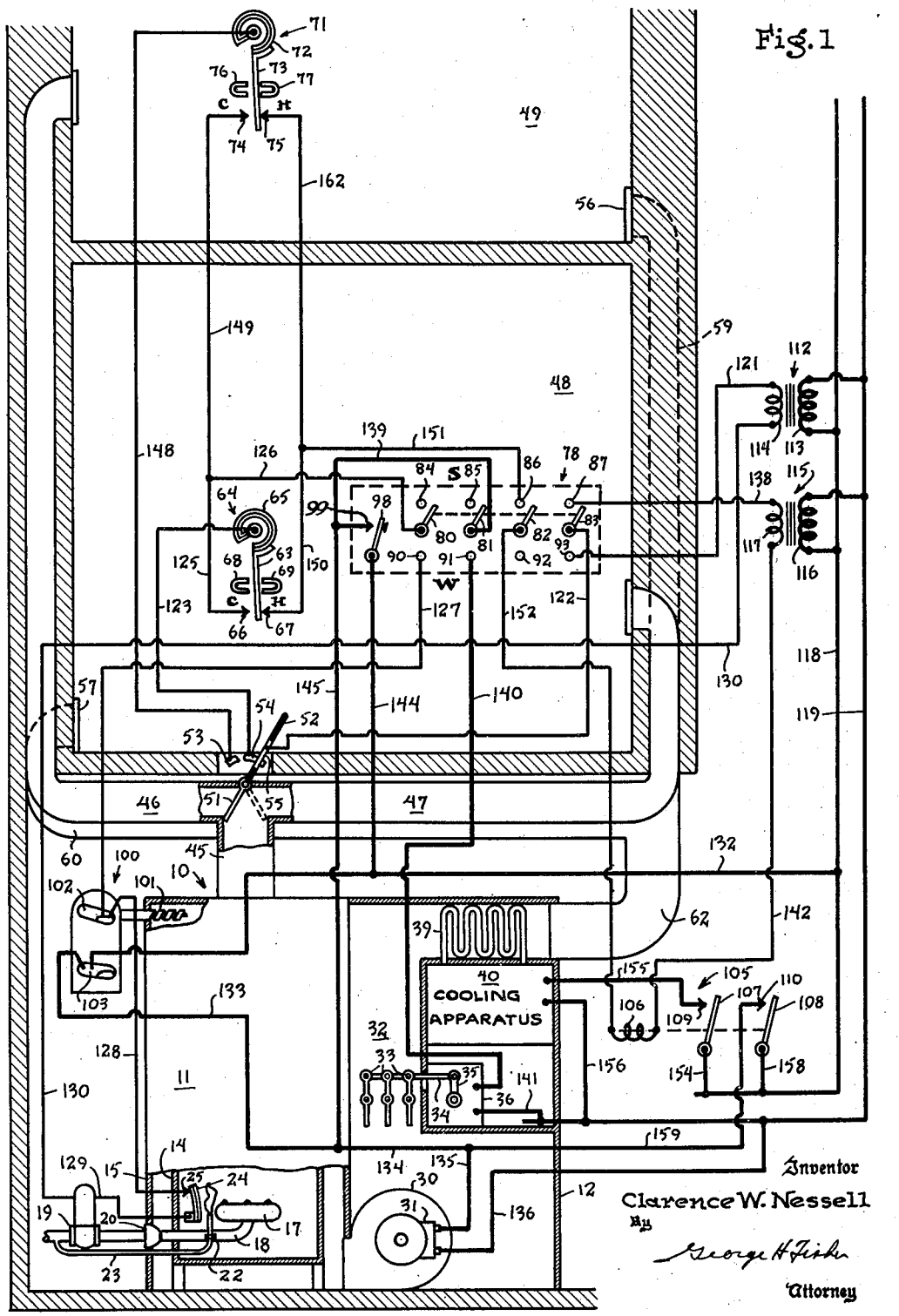

April 1, 1941.   C. W. NESSELL   2,236,914
TEMPERATURE CONTROL SYSTEM
Filed Feb. 17, 1939   2 Sheets-Sheet 1

Inventor
Clarence W. Nessell
By George H. Fisher
Attorney

April 1, 1941.   C. W. NESSELL   2,236,914
TEMPERATURE CONTROL SYSTEM
Filed Feb. 17, 1939   2 Sheets-Sheet 2

Inventor
Clarence W. Nessell
By George H. Fisher
Attorney

Patented Apr. 1, 1941

2,236,914

UNITED STATES PATENT OFFICE 2,236,914

TEMPERATURE CONTROL SYSTEM

Clarence W. Nessell, Dayton, Ohio, assignor to Minneapolis-Honeywell Regulator Company, Minneapolis, Minn., a corporation of Delaware Application February 17, 1939, Serial No. 256,948

8 Claims. (Cl. 257—3)

The present invention relates to a temperature control system and more particularly to a summer-winter air conditioning system.

It is often desirable to divide a building whose temperature is being controlled into two or more zones to permit shutting off certain sections of the building. In the case of a residence, it is particularly desirable where the residence is to be cooled to cool only the downstairs during the day and the upstairs at night. Such a procedure results in considerable saving in expense of operation of the cooling equipment as well as in the initial cost of the equipment. It occasionally happens, also in the case of heating, that it is desirable to heat only one portion of a building during certain portions of the day. The present invention is concerned with a temperature control system for such a zoning arrangement.

An object of the present invention is to provide an air conditioning system for a plurality of zones wherein provision is made for delivering the air from the air conditioning device to any one of the zones or simultaneously to all of the zones and in which means are provided for placing the air conditioning device under the control of the individual thermostat when the air is delivered to one zone or, when the air is delivered to all of the zones, under the control of the thermostat in the zone normally most frequently occupied.

A further object of the present invention is to provide such a system wherein there are two zones, one including the sleeping quarters and the other including the living quarters, in which the air conditioning means is controlled by the thermostat in the zone including the living quarters when air is being supplied to both zones and by the thermostat in the respective zone when it is being supplied to only one.

A further object of the present invention is to provide a system such as set forth in the previous objects in which the flow of air to the respective zones is controlled by a splitter damper which has a transfer device associated therewith to transfer the control of the air conditioning means from one zone thermostat to another.

A still further object of the invention is to provide such a system wherein the air flow to the respective zones is controlled by individual motor operated dampers having individual manual switches controlling the same and in which the switches are also effective to control the connections of the various zone thermostats to the air conditioning means.

A further object of the present invention is to provide a summer-winter temperature control system wherein there is a circulated fluid medium for changing the temperature of the space and in which the circulating means is controlled by the temperature of the fluid medium in winter independently of the space temperature and in which the circulating means is controlled by the room thermostat in summer independently of the temperature of the medium.

A further object of the present invention is to provide an air conditioning system with a summer-winter changeover device in which operation of the summer-winter changeover device automatically reduces the air flow.

Figure 2:
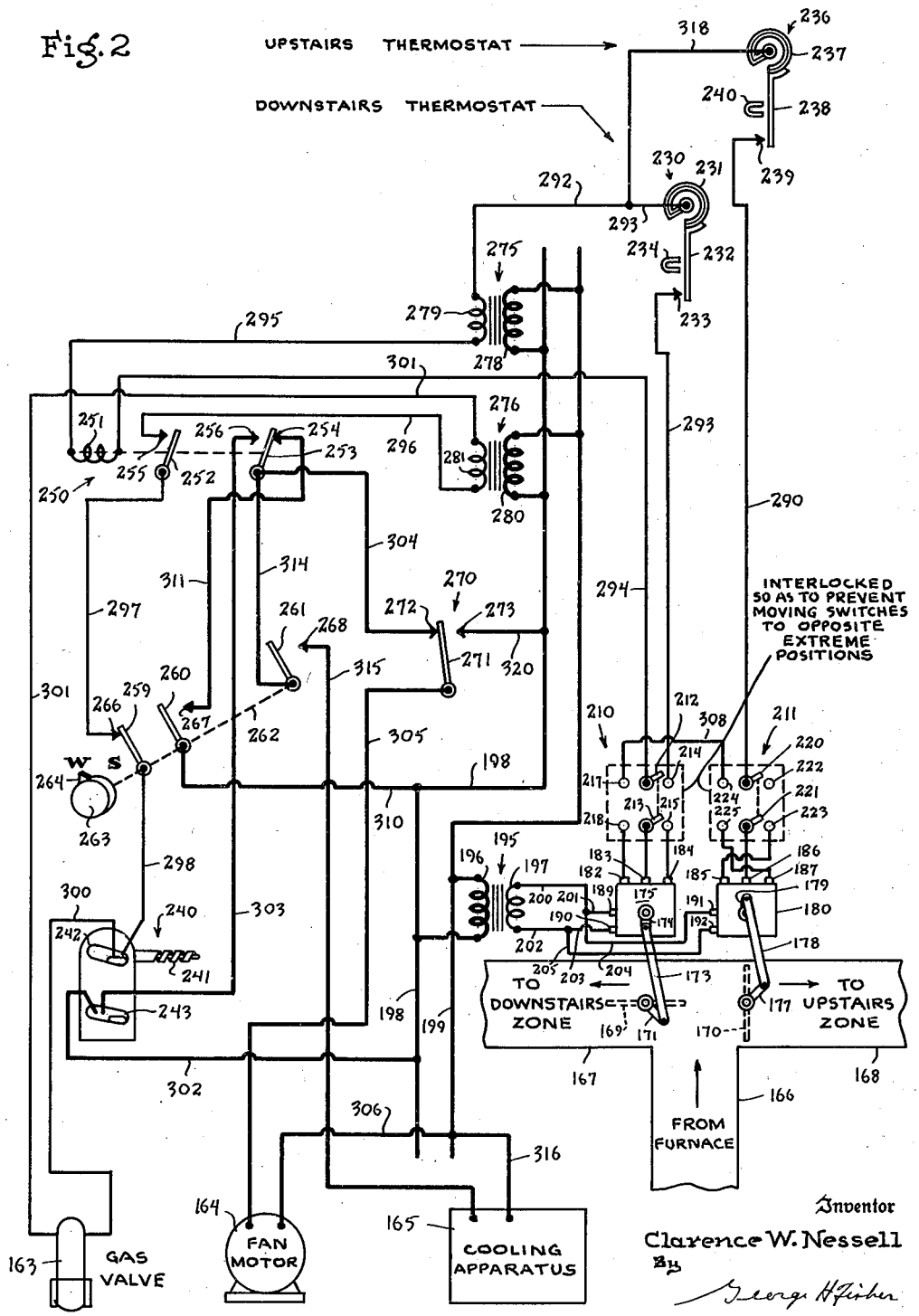

Other objects of the invention will be apparent from a consideration of the accompanying specification, claims and drawings, of which Figure 1 is a schematic view of one form of the invention, and Figure 2 is a schematic view of a modified form of the invention.

Referring to the drawings, an air conditioner is generally designated by the reference numeral 10. The air conditioner is divided into two compartments 11 and 12, the compartment 11 includes the heating apparatus of the conditioner while the compartment 12 includes the cooling and circulating means. The compartment 11 includes a furnace surrounded by a jacket 15. Located within the furnace 14 is a burner 17 supplied with gas by a pipe 18, the supply of gas being controlled by a motorized valve 19. An air mixer 20 of conventional structure is inserted between the valve and the burner to provide the proper mixture of gas and air. A pilot burner 22 is located adjacent the burner 17 and is connected by a pipe 23 to the gas line 18 behind the valve 19. Located adjacent to the pilot burner is a bimetallic element 24 which is adapted to engage with a fixed contact 25. A pilot burner 22 is of the constantly burning type and the valve 19 is of the type which when the motor thereof is energized, is opened and maintained open so long as the energization continues. It will be apparent that upon energization of the motor of valve 19, gas is supplied to the burner 17, which gas is ignited by the pilot burner 22. The bimetal 24 and contact 25 constitute a safety pilot switch which insures that the valve will not be open if the pilot burner is not ignited, as will be more apparent from the subsequent description.

A fan 30 is located in the compartment 12, the fan being driven by a motor 31. The air supplied to fan 30 flows through a return air duct 32 in which is located a damper comprising a plurality of pivotally, individually mounted dampers 33. These dampers are all connected to an operating rod 34 which in turn is connected to the crank 35 of a damper motor 36. The damper motor is shown in its deenergized position to which it is biased by some biasing means (not shown). When energized the arm 35 is moved an angular distance of approximately 30° to the right to effect partial closure of the dampers 33.

Also located in the return air passage 32 in a horizontal portion thereof are cooling coils 39. These cooling coils 39 are associated with cooling apparatus 40 of any conventional type. Upon energization of the cooling apparatus, a cooling fluid is circulated through coils 39 so as to cool the air supplied to the fan. The air after being passed over the furnace 14 is forced through the supply duct 45 which communicates with branch ducts 46 and 47. The branch duct 47 communicates with a zone 48 and the branch duct 46 with zone 49. The zone 48 is a downstairs zone whereas the zone 49 is the upstairs zone. The downstairs zone is, as is customary, used primarily as the living quarters while the zone 49 is used primarily as the sleeping quarters.

A splitter damper 51 is located at the junction of supply duct 45 with the branch ducts 46 and 47 and is provided with a handle 52 which may conveniently extend into the zone 48 for convenient manipulation thereof. The handle 52 is provided with a conductive portion 55 which is adapted to engage either one of two contact bar members 53 or 54. The contact bar 54 is relatively elongated so that when the splitter damper is either in the position shown or in an intermediate position in which the air is being supplied to both branch ducts, the conductive portion 55 of handle 52 engages the contact bar 54 whereas when the damper is in the dotted position, segment 53 is in engagement with the conductive portion 55 of handle 52.

The air is returned through return air registers 56 and 57 which communicate with branch return air ducts 59 and 60. The branch ducts 59 and 60 in turn communicate with a common return air duct 62 which connects with the return air passage 32 of the air conditioning apparatus 10.

Located in the zone 48 is a room thermostat 64 which thermostat is of conventional construction comprising a bimetallic element 65 to which is secured a contact arm 63 adapted to engage with either of two contacts 66 and 67. A pair of magnets 68 and 69 are provided on opposite sides of the contact arm to insure that the contact arm 63 moves from one contact to another with a snap action. The contact 66 is the contact engaged upon a temperature fall and the contact 67 is the contact engaged upon a temperature rise, as indicated by the attached legends "C" and "H". These contacts can, accordingly, be designated as the "cold" or "hot" contacts, respectively.

Located in the zone 49 is a second thermostat 71. This thermostat is similar to thermostat 64, comprising a bimetallic element 72 to which is secured a contact arm 73 adapted to engage either of two fixed contacts 74 and 75. The magnets 76 and 77 are provided for the same purpose as the magnets 68 and 69 in the thermostat 64. In the case of thermostat 71, the contact 74 is the cold contact and the contact 75 the hot contact.

A summer-winter control panel 78 is located in the zone 48. This panel comprises four switch blades 80, 81, 82, and 83. These switch blades are tied together so as to be moved together in unison. In their upper or summer position the switch blades 80 to 83 are in engagement with contacts 84, 85, 86, and 87, respectively. In their lower position the switch blades are in engagement with contacts 90, 91, 92, and 93. As shown, the switch blades are in engagement with neither set of contacts. The control panel 78 also includes a fan switch comprising a switch blade 98 adapted to engage a fixed contact 99. When the switch blade 98 is engaged with the contact 99 the fan 30 is operated continuously as will be explained later.

A thermostatic switch 100 is provided for the purpose of controlling in accordance with the temperature of the air leaving furnace 14. This switch comprises a helical bimetallic element 101 which is operatively connected to a pair of mercury switches 102 and 103. The mercury switch 103 is shown in the open position and the mercury switch 102 in the closed position. Upon a temperature rise, the mercury switches 103 and 102 are tilted in a counter-clockwise direction so that switch 103 is first moved to circuit making position and switch 102 is then moved to circuit open position. The switch 103 is set to close at a temperature such that the delivery of air to the zones at that temperature will not produce discomfort. The switch 102 is set to open only if the temperature becomes sufficiently high so as to cause further operation of the burner to be unsafe.

A relay is generally designated by the reference numeral 105. This relay comprises a relay coil 106 and two switch blades 107 and 108. The switch blades 107 and 108 are adapted to be engaged with fixed contacts 109 and 110, being biased out of engagement with the same and being moved into engagement therewith upon energization of relay coil 106.

Low voltage power for operation of the system is supplied by a pair of step-down transformers 112 and 115. The transformer 112 comprises a line voltage primary 113 and a low voltage secondary 114. Similarly, the transformer 115 comprises a line voltage primary winding 116 and a low voltage secondary 117. The two primary windings 113 and 116 are connected to line wires 118 and 119 leading to any suitable source of power (not shown).

*Operation of Figure 1 species*

Let it be assumed that the switch blades of the control panel 78 are in their winter position so that switch blades 80, 81, 82, and 83 engage contacts 90 to 93, respectively. Under these circumstances, the apparatus will be in the position occupied when it is desired to heat the downstairs zone 48 and when the thermostat in that zone is satisfied. Let it be assumed now that the temperature drops until contact blade 63 is moved out of engagement with contact 67 and into engagement with contact 66. A circuit will now be established to the gas valve 19 as follows: from the upper terminal of secondary 114 through conductor 121, contact 93, switch blade 83, conductor 122, conductive portion 55 of handle 52, contact 54, conductor 123, bimetallic element 65, contact arm 63, contact 66, conductors 125 and 126, switch blade 80, contact 90, conductor 127, switch 102, conductor 128, contact 25, bimetallic element 24, conductor 129, motorized valve 19, and conductor 130 to the other terminal of secondary 114. The establishment of this circuit will result in the valve 19 being opened so that gas is supplied to the burner 17 which gas is ignited by the pilot burner 22.

The heating of the furnace as a result of the operation of the burner 17 will cause the temperature of the air passing out through the delivery duct 45 to be raised so that in a very short period of time switch 103 is closed. Upon closure of switch 103, the fan motor 31 is energized by the following circuit: from line wire 118 through conductor 132, fan switch 103, conductors 133, 134, and 135, fan motor 31, and conductor 136 to the other line wire 119. The operation of the fan forces the heated air through the supply duct 45 and because of the fact that splitter damper 51 is in a position to close off duct 46, this air all passes through duct 47 to the various rooms associated therewith, these rooms constituting the downstairs zone 48.

The flow of air to the rooms will be somewhat reduced by reason of the fact that the dampers 33 will move to their minimum open position as soon as the fan starts during winter operation. The energizing circuit to the damper motor 36 is as follows: from line wire 118 through conductor 132, fan switch 103, conductors 133, 145, and 139, switch blade 81, contact 91, conductor 140, damper motor 36, and conductor 141 to the other line wire 119. The energization of the damper motor causes it to move the damper arm 35 about 30° to the right and thus partially close the damper 33, as previously explained. It will be understood that the damper motor will occupy this position whenever the fan motor is energized when the summer-winter switch is in its winter position since when switch blade 81 engages contact 91, damper motor 36 is connected in parallel with the fan motor. The reason for this reduced flow is that it is not necessary to have as much circulation in winter as it is in summer.

It is to be understood that if at any time the temperature in the bonnet of the furnace reaches an excessively high value, a switch 102 will be opened and since this switch is in series with the valve 19, the flow of gas to the burner will be interrupted. Similarly, if at any time the pilot burner goes out, the bimetal 24 will cool off separating from the contact 25 and interrupting the circuit to the valve 19.

The burner will normally continue to run until the temperature to which thermostat 64 is subjected has risen sufficiently to cause contact blade 63 to move out of engagement with contact 66 and into engagement with contact 67. When this happens the burner stops operating and the bonnet gradually cools down so as to open the switch 103 within a relatively short period of time. The opening of switch 103 will terminate fan operation and cause damper motor 36 to return the dampers 33 to wide open position. If for any reason it is desirable to have continuous fan operation, this may be done by manually moving switch blade 98 into engagement with contact 99 whereupon the following circuit will be established to fan motor 31: from line wire 118 through conductors 132 and 144, switch blade 98, contact 99, conductors 145, 134, and 135, fan motor 31 and conductor 136 to the other line wire 119. At the same time, damper motor 36 will be energized.

The operation which has just been described is that which occurs when the splitter damper is in the position shown in the drawings, that is, in the position in which all of the air is directed to the downstairs zone. During the heating cycle, the normal position of the splitter damper will be its intermediate position in which air is supplied to both zones. The operation of the system, when the splitter damper is in this position, will be exactly the same as that described when the splitter damper is in the position shown. The only difference will be that the air will be supplied to both zones instead of merely to one. The reason for no change being effected in the control action is that when the splitter damper is moved to its intermediate position the conductive portion 55 of handle 52 still engages the contact bar 54.

While it is primarily during the cooling cycle that only one zone will be operated at a time, situations may occur in which it is desired to heat only the upstairs zone. Under such circumstances the handle 52 of the splitter damper is moved to the extreme left so that the splitter damper 51 assumes its dotted line position wherein duct 47 is closed off and duct 46 is in communication with the main supply duct 45. In making this shift in position of the splitter damper the conductive portion 55 of handle 52 is moved out of engagement with contact bar 54 and into engagement with contact bar 53. This, in effect, interrupts the connection of thermostat 64 to the heating equipment and connects thermostat 71 to the equipment. When the splitter damper is in this position and the temperature in zone 49 drops to a point such that thermostat blade 73 engages contact 74 a circuit is established to the gas valve 19 as follows: from the upper terminal of transformer secondary 114 through conductor 121, contact 93, switch blade 83, conductor 122, the conductive portion 55 of handle 52, contact 53, conductor 148, bimetallic element 72, contact arm 73, contact 74, conductors 149 and 126, switch blade 80, contact 90, conductor 127, limit switch 102, conductor 128, contact 25, bimetallic element 24, conductor 129, gas valve 19, and conductor 130 to the other terminal of secondary 114. The operation upon the establishment of this energizing circuit to the valve 19 is the same as that previously described, that is, the bonnet temperature will rise until the fan switch is closed to place the fan in operation. The burner will continue in operation until the room temperature is satisfied or until the high limit switch or safety pilot switch is opened.

When it is desired to have the air conditioning plant operate on the summer cycle, the switch blades 80, 81, 82, and 83 are moved to their uppermost position wherein they are in engagement with contacts 84 to 87. Let it first be assumed that the splitter damper is in the position shown which is the position in which it will be placed during the daytime. As in the case of winter operation, the thermostat 64 is in control of the air conditioning apparatus. Let it be assumed now that the temperature in zone 48 rises to the point such that switch blade 63 is engaged with contact 67. As soon as this occurs the following circuit will be established to relay coil 106: from the upper terminal of secondary 117 through conductor 138, contact 87, switch blade 83, conductor 122, the conductive portion 55 of handle 52, contact bar 54, conductor 123, bimetallic element 65, contact blade 63, contact 67, conductors 150 and 151, contact 86, switch blade 82, conductor 152, relay coil 106, and conductor 142 to the other terminal of secondary 117. The energization of relay coil 106 causes switch blades 107 and 108 to be moved into engagement with contacts 109 and 110. The engagement of switch blade 107 with contact 109 results in the following circuit to the cooling apparatus 40: from line wire 118 through conductor 154, switch blade 107, contact 109, conductor 155, cooling apparatus 40 and conductor 156 to the other line wire 119. The operation of the cooling apparatus 40 will result in cooling fluid being circulated through coil 39.

The engagement of switch blade 108 with contact 110 will result in the following circuit being established to fan motor 31: from line wire 118 through conductor 158, switch blade 108, contact 110, conductors 159 and 135, fan motor 31, and conductor 136 to the other line wire 119. It will be noted that the fan motor circuit just traced is independent of the bonnet switch 103 and is dependent upon the thermostat 64. It would obviously be undesirable to have the fan dependent upon bonnet switch 103 inasmuch as this switch is closed only upon the temperature reaching a predetermined value higher than that which would be encountered in the absence of furnace operation.

Inasmuch as the energization of damper motor 36 is dependent upon the switch 81 being in its winter position, the damper motor will be deenergized so that the dampers assume the position shown in the drawings in which a maximum flow of air is permitted. This air is drawn through the return air ducts over the cooling coils 39 and is forced upwardly through the cold furnace, through the supply duct 45, and the branch duct 47.

When the switch is in its summer position, it is impossible to open the gas valve since the connection from the upper terminal of transformer secondary 114 leads to contact 93 which is not engaged by the switch member 83. Thus it is impossible for power to be supplied to the gas valve 19.

During the cooling cycle, the customary practice would be to leave the splitter damper in the position shown in the daytime and at night to move the damper over to its dotted line position wherein the conductive portion 55 of handle 52 engages contact 53. Under these circumstances the thermostat 71 is in control and thermostat 64 has no controlling effect whatever. When the temperature rises to the point such that contact blade 73 engages contact 75, a circuit is established as follows: from the upper terminal of secondary 117 through conductor 138, contact 87, switch blade 83, conductor 122, the conductive portion 55 of handle 52, contact 53, conductor 148, bimetallic element 72, contact arm 73, contact 75, conductors 162 and 151, contact 86, switch blade 82, conductor 152, relay coil 106, and conductor 142 to the other line of secondary 117. The energization of relay coil 106 will have the same effect as previously described, namely, the energization of the cooling apparatus and of the fan motor 31.

As in the case of winter operation, a circuit may be established to the fan independently of the thermostatic controls by the moving of switch blade 98 into engagement with contact 99. This is often desirable during the summer months so that even during the periods the cooling apparatus is not running a certain amount of cooling effect is provided by the circulation of the air.

If for any reason, it is desired to introduce air to both zones during the cooling cycle, the splitter damper will be moved to its intermediate position. The operation under these circumstances will be the same as when the splitter damper is in the position shown since conductive portion 55 will still be in engagement with contact 55.

Species of Figure 2

In Figure 2, a different form of the invention is shown. In this form of the invention, the fan is controlled during winter operation by both room thermostat and bonnet thermostat temperatures. Provision is further made for power operation of the dampers controlling the flow of air to the two zones. A further difference between the two systems is that the thermostats use the same contacts for summer and winter operation.

Referring specifically to the drawings, a gas valve is indicated by the reference numeral 163, a fan motor by the numeral 164, a cooling apparatus by the numeral 165. It is to be understood that these correspond to the valve 19, the fan motor 31, and the cooling apparatus 40 of the Figure 1 species. Since these elements are associated with the furnace in exactly the same manner as in Figure 1, the furnace has not been shown in order to avoid complicating the drawings more than necessary. The supply duct from the air conditioning apparatus is designated by the reference numeral 166 and this duct is provided with two branches 167 and 168, the former leading to the downstairs zone and the latter to the upstairs zone.

Instead of using a splitter damper to control the relative flow through the two branch ducts, separate dampers are placed in each duct. The damper in duct 167 is designated by the reference numeral 169 and that in duct 168 by that in duct 170. Each of these dampers is pivotally mouned in position. A crank arm 171 is secured to the damper 167 and this crank arm is connected through a link 173 to the crank arm 174 of a damper motor 175. Similarly, the damper 170 is provided with a crank arm 177 which is connected through a link 178 to the crank arm 179 of a damper motor 180. Each of the damper motors 175 and 180 is of the conventional two-position type having a three-wire control circuit. Such damper motors on having a circuit established between the common terminal and one of the other terminals will cause the motor to revolve through 180° and then stop, and upon a circuit being established between the common terminal and the other terminal, the motor will revolve another 180° in the same direction. The control terminals of the motor 175 are designated by the reference numerals 182, 183, and 184 and the control terminals of motor 180 by the reference numerals 185, 186, and 187. The center terminals 183 and 186 are the common terminals of these motors. In the case of motor 175 when a circuit is established between the common terminal 183 and terminal 182, the damper 169 is moved to the closed position and when a circuit is established between common terminal 183 and terminal 184, the damper motor moves the damper to open position as shown. Similarly, in the case of damper motor 180, when a circuit is established between common terminal 186 and terminal 185, the damper motor moves the damper 170 to closed position, as shown. When a circuit is established between common terminal 186 and terminal 187, the damper is moved to open position. Each of the damper motors is provided with power terminals to supply power for operation of the motor. The power terminals of damper motor 175 are designated by the numerals 189 and 190 and the power terminals of motor 180 are designated by the numerals 191 and 192. Power is supplied to the damper motors by a step-down transformer 195 comprising a line voltage primary 196 and a low voltage secondary 197. The line voltage primary 196 is connected to line wires 198 and 199 leading to a suitable source of power (not shown). The secondary 197 is connected by means of conductors 200, 201, 202, and 203 to the power terminals 189 and 190 of motor 175. The secondary 197 is also connected to terminals 191 and 192 of motor 180 by conductors 200, 204, 202, and 205.

Associated with each damper motor is a double-throw, double-pole switch. The damper motor 175 has a switch 210 associated therewith and damper motor 180 has a switch 211 associated therewith. The switch 210 comprises a pair of switch blades 212 and 213 which in one position are adapted to engage contacts 214 and 215, respectively, and in another position are adapted to engage contacts 217 and 218. Switch blade 213 is connected to common terminal 183 of motor 175, contact 218 to the terminal 182, and contact 215 to the terminal 184.

The switch 211 comprises a pair of switch blades 220 and 221 which in one position are adapted to engage contacts 222 and 223 and in another position contacts 224 and 225. The switch blade 221 is connected to the common terminal 186 of motor 180, contact 225 to the terminal 187, and the contact 223 to the terminal 185.

The two switches 210 and 211 are mechanically interlocked so that they cannot assume opposite extreme positions. If the switches were permitted to occupy such positions, both dampers would be closed. Under certain circumstances, the fan could be operated when the dampers were so closed with the result that there would be no provision for the escape of the air forced through the ducts by the fan. With the switches mechanically interlocked as explained, the switches can occupy the position shown in which dampers 169 and 170 are open and closed, respectively, a position in which the two sets of switch blades point to each other and in which dampers 169 and 170 are both open, or a position in which the two sets of switch blades point to the left and in which damper 169 is closed and damper 170 is open. They cannot occupy positions in which they point away from each other.

A thermostat in the downstairs zone is designated by the reference numeral 230. This thermostat comprises a bimetallic element 231 to which is secured a contact arm 232. The contact arm 232 is adapted to engage a fixed contact 233. Cooperating with the contact arm 232 is a magnet 234 which serves to impart a snap action to the movement of contact arm 232. Contact arm 232 is engaged with contact 233 upon a fall in temperature to a predetermined value.

The upstairs zone thermostat is designated by the reference numeral 236. This thermostat comprises a bimetallic element 237 to which is secured a contact arm 238 adapted to engage with a fixed contact 239. A magnet 240 is associated with contact arm 238 for the purpose of imparting a snap action movement thereto.

A thermostatic bonnet temperature responsive switch is indicated by the reference numeral 240. This switch corresponds in structure to switch 100 of Figure 1. In other words, this switch comprises a helical bimetallic element 241 which is operatively connected to switches 242 and 243 and is adapted upon a temperature rise to rotate these switches in a counter-clockwise direction. Switch 243 is the fan switch and is adapted to be closed upon a slight rise in temperature while switch 242 is the limit switch and is opened only upon the temperature rising to an undesirably high value.

A relay is generally designated by the reference character 250. This relay comprises a relay coil 251 and a pair of switch blades 252 and 253. Switch blade 253 is biased into engagement with a contact 254. The switch blades 252 and 253 are adapted upon energization of relay coil 251 to be moved against the action of biasing means associated therewith into engagement with contacts 255 and 256. Associated with the relay 250 and preferably in the same control box therewith is a summer-winter switch comprising three switch blades 259, 260, and 261. All of these switch blades are secured to a common shaft 262 to which is secured a knob 263. The knob 263 is provided with a pointer 264 which is associated with a plate bearing the indicia W and S indicating the winter and summer positions thereof. The switch is shown in its winter position. In this position switch blade 259 is in engagement with a contact 266. In the summer position the switch blades 260 and 261 are in engagement with contacts 267 and 268, respectively.

A manual switch 270 is provided for giving continuous fan operation if desired. This switch comprises a switch blade 271 adapted to be moved into engagement with either a fixed contact 272 or a fixed contact 273.

A pair of step-down transformers 275 and 276 are provided for the purpose of supplying low voltage power for the operation of the control portion of the system. The transformer 275 comprises a line voltage primary 278 connected to the line wires 198 and 199 and a low voltage secondary 279. The transformer 276 similarly comprises the line voltage primary 280 connected to line wires 198 and 199 and a low voltage secondary 281.

*Operation of Figure 2 species*

The elements are shown in the position occupied during the winter heating cycle when the damper to the downstairs zone is open and the damper to the upstairs zone is closed. This position of the dampers is obtained when the switch blades 212 and 213 are in engagement with contacts 214 and 215 and when switch blades 220 and 221 are in engagement with contacts 222 and 223. The engagement of switch blade 213 with contact 215 closes a circuit between terminals 183 and 184 of damper motor 175 to cause damper motor to move the damper to the open position, as previously explained. The engagement of switch blade 221 with contact 223 causes a circuit to be established between the common terminal 186 and terminal 185 of damper motor 180, causing the motor 180 to move the damper to the closed position.

With the switches 210 and 211 positioned as explained, the downstairs thermostat 230 is in control and the upstairs thermostat 236 has no effect. It will be noted that the fixed terminal 239 of the upstairs thermostat is connected by conductor 290 to switch blade 220. This switch blade, in the position of switch 211 which has been described, is in engagement with terminal 222 which has no external connections. It will accordingly be clear that thermostat 236 is effectively disconnected while switch 211 is in this position.

Let it be assumed now that the temperature to which thermostat 230 is subjected decreases to a point such that contact arm 232 is moved into engagement with contact 233. This will result in the establishment of the following circuit to the relay coil 251: from the upper terminal of secondary 279 through conductors 292 and 293, bimetallic element 231, contact arm 232, contact 233, conductor 293, contact 214, switch blade 212, conductor 294, relay coil 251, and conductor 295 to the other terminal of secondary 279. The establishment of this energizing circuit to relay coil 251 results in switch blades 252 and 253 being moved into engagement with contacts 255 and 256. The engagement of switch blade 252 with contact 255 results in the establishment of the following energizing circuit to the gas valve 163: from the lower terminal of secondary 281 through conductor 296, contact 255, switch blade 252, conductor 297, contact 266, switch blade 259, conductor 298, limit switch 242, conductor 300, gas valve 163, and conductor 301 to the other terminal of secondary 281.

The movement of switch blade 254 into engagement with contact 256 establishes a circuit to the fan motor 164 through the fan switch 243. When the bonnet temperature has risen sufficiently to cause closure of this switch, a circuit will be established to the fan motor as follows: from line wire 198 through conductor 302, fan switch 243, conductor 303, contact 256, switch blade 253, conductor 304, contact 272, switch blade 271, conductor 305, fan motor 164, and conductor 306 to the other line wire 199. It will be noted that the circuit to the fan motor is dependent upon both the fan switch of the bonnet thermostat and also upon the energization of the relay controlled by the room thermostat. Thus, unlike the system of Figure 1, the fan operation is terminated immediately upon the termination of the call for heat. Thus under normal circumstances the system continues to run until the room thermostat 230 becomes satisfied at which time both the burner and fan operation are terminated.

As previously explained in connection with Figure 1, the usual position for the dampers during winter will be the position in which heat is being supplied to both the upstairs and downstairs zones. The upstairs zone damper 170 may be opened by moving the switch blades 220 and 221 into engagement with contacts 224 and 225. When this is done the circuit between common terminal 186 and terminal 185 is interrupted and a circuit is established between common terminal 186 and terminal 187 of damper 180 to cause that motor to move damper 170 to its open position.

The movement of switch blade 220 into engagement with contact 224 connects the conductor 290 leading from contact 239 of thermostat 236 with contact 224 which is connected with conductor 308. The conductor 308 leads to contact 217 but inasmuch as switch blade 212 is in engagement with contact 214, the circuit is terminated at contact 217. Thus again thermostat 236 is effectively disconnected from the controlling system.

The connections of thermostat 230 into the system are unchanged since these connections depend solely upon the engagement of switch blade 212 with contact 214. It is accordingly unnecessary to describe the operation of the thermostat 230 under these conditions since it will be obvious that it is exactly the same as that previously described when the air was being supplied to only the downstairs zone.

The operation of the system when the air is delivered only to the upstairs zone will be described only in connection with the cooling cycle since it is primarily during the cooling cycle that there is the need of supplying the conditioned air to only the upper zone. The operation of the system in this manner during the heating cycle will be apparent from the subsequent description of the operation in this manner during the cooling cycle.

Let it be assumed now that the summer-winter switch is moved to the summer position in which switch blades 260 and 261 are engaged with contacts 267 and 268. The movement of the summer-winter switch to the summer position also causes disengagement of switch blade 259 from contact 266. Since the switch blade 259 is in series with the gas valve circuit, it is obvious that a separation of this switch blade from its associated contact prevents opening of the gas valve. During the summer cycle it is of course desirable to operate the cooling apparatus whenever the temperature rises above a certain point. In other words, during the cooling cycle the conditioning apparatus should be operated when the thermostat contacts are disengaged rather than when they are engaged. When the thermostat contacts are disengaged the relay 251 is deenergized and a circuit is established to the fan motor as follows: from line wire 198 through conductor 310, switch blade 260, contact 267, conductor 311, contact 254, switch blade 253, conductor 304, contact 272, switch blade 271, conductor 305, fan motor 164, and conductor 306 to the other line wire 199. At the same time a circuit is established to the cooling apparatus as follows: from line wire 198 through conductor 310, switch blade 260, contact 267, conductor 311, contact 254, switch blade 253, conductor 314, switch blade 261, contact 268, conductor 315, cooling apparatus 165, and conductor 316 to the other line wire 199. Thus whenever the relay is deenergized the fan motor and the cooling apparatus are both operated. As soon as the thermostatic contact arm 232 of thermostat 230 engages its contact 233, the relay coil 251 will be energized through the same circuit as traced in connection with the winter operation. Upon energization of the relay coil 251, switch blade 253 will be moved out of engagement with contact 254 so as to terminate operation of both the fan motor and the cooling apparatus.

During the summer operation, it is often desirable to cool only the upstairs portion of the house. This is particularly true at night, as previously explained. This may be done by reversing the positions of switches 210 and 211 from those shown. In other words, switch blades 212 and 213 will be moved into engagement with contacts 217 and 218 while switch blades 220 and 221 will be moved into engagement with contacts 224 and 225. The moving of switch blade 221 into engagement with contact 225 will result in the damper 170 being moved to open position, as previously explained. Similarly, the moving of switch blade 213 into engagement with contact 218 will cause the damper motor to move the damper 169 to closed position. The moving of switch blade 212 out of engagement with contact 214 interrupts the connection of thermostat 230 in the control circuit. The movement of switch blade 220 into engagement with contact 224 when the switch blade 212 is in engagement with contact 217 results in thermostat 236 being connected into the control circuit.

Thus with the switches in the position just described when the thermostat 236 is subjected to a temperature sufficiently low to cause engagement of contact arm 238 with contact 239, a circuit will be established to relay coil 251 as follows: from the upper terminal of secondary 279 through conductors 292 and 318, bimetallic element 237, contact arm 238, contact 239, conductor 290, contact arm 220, contact 224, conductor 308, contact 217, switch blade 212, conductor 294, relay coil 251, and conductor 295 to the other terminal of secondary 279. The energization of the relay will prevent the operation of either the fan motor or the cooling apparatus as previously described. When the temperature to which thermostat 236 is subjected rises sufficiently high, contact arm 238 will be separated from contact 239 so that the relay coil is de-energized to cause operation of the fan motor and cooling apparatus as also previously described.

If at any time during the summer cycle, it is desired to operate both the upstairs and downstairs zones the switches 210 and 211 are moved to the same positions as they were moved to during the winter operation to accomplish this purpose. When the switches are in this position the downstairs thermostat 230 is placed in control of the relay coil 251 to function in the same manner as described in connection with the supply of cooled air to the downstairs zone alone.

If at any time during either winter or summer it is desired to have the fan motor operated continuously, the switch 271 is moved out of engagement with contact 272 and into engagement with contact 273 whereupon a circuit will be established to the fan motor 164 as follows: from line wire 198 through conductor 320, contact 273, switch blade 271, conductor 305, fan motor 164, and conductor 306 to the other line wire 199. This, it will be noted, is independent of any thermostatic controls and results in continuous operation of the fan.

It will be noted that with both of these two systems, the air conditioning apparatus is placed under the control of the respective zone thermostat when the air is being supplied to one zone and when the air is being supplied to both zones it is placed under the control of the thermostat in that zone normally most frequently occupied, namely, the zone including the living quarters. It will further be noted that the systems automatically provide for a reduced flow of air during winter. The systems furthermore make possible continuous fan operation at any time during both summer and winter.

While I have described certain specific embodiments of my invention, it is to be understood that this is for purposes of illustration only and that the invention is limited only by the scope of the appended claims.

I claim as my invention:

1. In a summer-winter air conditioning system, air heating and cooling means, means for circulating the air treated by said means to a space whose condition is to be controlled, a thermostat responsive to the temperature of the space, a changeover device movable between a summer and a winter position, means including said thermostat for causing operation of said heating means when said changeover device is in its winter position whenever the temperature of the space falls below a predetermined value and for causing operation of said cooling means when said changeover device is in its summer position whenever the temperature of the space rises above a predetermined value, and means responsive to said changeover device to cause said circulating means to produce a smaller flow of air when said device is in its winter position than when said device is in its summer position.

2. In a summer-winter air conditioning system, electrically controlled means for changing a condition influencing the effective temperature of the air, duct means for conveying the air from said condition changing means to a space whose condition is to be controlled, a controlling switch responsive to a condition of the space indicative of the need for operation of said condition changing means, a changeover switch movable between a summer and a winter position, circuit means including said controlling switch and said changeover switch effective when said changeover switch is in its winter position and when said space condition is below a predetermined value to cause operation of said condition changing means, said circuit means being effective when said changeover switch is in its summer position and when said space condition is above a predetermined value to cause operation of said condition changing means, a motor driven fan for forcing a circulation of air through said duct means, damper means in said duct means movable between a maximum and a minimum flow position, an electric motor for positioning said damper means, connections between said electric motor and said changeover switch effective when said changeover switch is moved to its winter position to move said damper means to its minimum flow position whenever said fan is operated, and means for causing said damper means to assume said maximum flow position whenever said fan is not being operated.

3. In an air conditioning system, means for changing a condition influencing the effective temperature of the air, a pair of zones, duct means leading from said condition changing means to said zones, a splitter damper in said duct means and movable to either of two extreme positions in which flow of air is permitted to only one of said zones or to an intermediate position in which flow of air is permitted to both zones, a controller in each of said zones responsive to a condition indicative of the demand for operation of said condition changing means, and a transfer device associated with said damper and movable therewith, said transfer device being operative when the damper is in either extreme position to place the controller in the zone to which air is admitted in control of the condition changing means and when the damper is in the intermediate position to place the controller in the zone normally most frequently occupied in control.

4. In an air conditioning system, electrically controlled means for changing a condition influencing the effective temperature of the air, a plurality of zones, duct means leading from said condition changing means to said zones, a damper in each duct leading to an individual zone, a damper motor for operating each of said dampers, a manually operated two position switch for each damper motor, connections including said switch for causing said damper motor to open or close its associated damper depending upon the position of said switch, said switch having no effect upon said other damper motors, a switch in each zone responsive to a condition indicative of the demand for operation of said condition changing means, and circuit means between said condition responsive switches, said manually operated switches, and said condition changing means effective when only one of said manually operated switches is in its damper open position to connect the condition responsive switch of the associated zone to said condition changing means and when all of said manually operated switches are in their damper open positions to connect to said condition changing means the condition responsive switch of a predetermined zone.

5. In an air conditioning system, electrically controlled means for changing a condition influencing the effective temperature of the air, a plurality of zones, duct means leading from said condition changing means to said zones, a damper in each duct leading to an individual zone, a damper motor for operating each of said dampers, a manually operated two position switch for each damper motor, connections including said switch for causing said damper motor to open or close its associated damper depending upon the position of said switch, said switch having no effect upon said other damper motors, a switch in each zone responsive to a condition indicative of the demand for operation of said condition changing means, circuit means between said condition responsive switches, said manually operated switches, and said condition changing means effective when only one of said manually operated switches is in its damper open position to connect the condition responsive switch of the associated zone to said condition changing means and when all of said manually operated switches are in their damper open positions to connect to said condition changing means the condition responsive switch of a predetermined zone, and means to prevent all of said two position switches being moved simultaneously to their damper closed positions.

6. In a summer-winter temperature control system, means for changing the temperature of a fluid medium, said temperature changing means comprising a heating means and a cooling means, a plurality of zones, means for circulating the fluid medium from said temperature changing means into heat exchanging relation with said zones, changeover means movable to either a heating or a cooling position in which said heating means or said cooling means is effective when said temperature changing means is operated, means independent of said changeover means selectively operable to direct all of the fluid from said temperature changing means into any one zone or to divide the fluid between said zones, a controller in each of said zones responsive to a condition in said zone indicative of the need for operation of said temperature changing means, and means operable when the fluid medium is all being supplied to one zone to place the condition responsive controller in that zone in control of the temperature changing means and when the fluid medium is being supplied to all of the zones to place the condition responsive means in a predetermined one of said zones in control, said last named means being so operable regardless of whether said heating or said cooling means is to be operated.

7. In a summer-winter air conditioning system, temperature changing means comprising a heating means and a cooling means, a plurality of zones, means for circulating air over said temperature changing means and into said zones, changeover means movable to either a heating or a cooling position in which said heating means or said cooling means is effective when said temperature changing means is operated, means independent of said changeover means selectively operable to direct all of the air from said temperature changing means into any one zone or to divide the air between said zones, a controller in each of said zones responsive to a condition in said zone indicative of the need for operation of said temperature changing means, and means operable when the conditioned air is all being supplied to one zone to place the condition responsive controller in that zone in control of the temperature changing means and when the conditioned air is being supplied to all of the zones to place the condition responsive means in a predetermined one of said zones in control, said last named means being so operable regardless of whether said heating or said cooling means is to be operated.

8. In a warm air heating system, a warm air furnace, a pair of zones, means for conveying the heated air to said zones, a thermostat in each of said zones responsive to the temperature in that zone, and means manually operable to direct all of the heated air to either zone and simultaneously to place the thermostat in said zone in control of the furnace, said manual means also being operable to divide the heated air between said zones and simultaneously to place the thermostat in a predetermined zone in control of the furnace.

CLARENCE W. NESSELL.